(12) United States Patent
Plehn et al.

(10) Patent No.: US 11,039,628 B2
(45) Date of Patent: Jun. 22, 2021

(54) METHODS OF USING SILAGE PRODUCED FROM A CORN HYBRID COMPRISING BROWN MIDRIB AND FLOURY TRAITS FOR MEAT PRODUCTION

(71) Applicant: AGRIGENETICS, INC., Indianapolis, IN (US)

(72) Inventors: Steve Plehn, Janeau, WI (US); John Anderson, Bethel, WI (US)

(73) Assignee: Agrigenetics, Inc., Indianapolis, IN (US)

( * ) Notice: Subject to any disclaimer, the term of this patent is extended or adjusted under 35 U.S.C. 154(b) by 0 days.

(21) Appl. No.: 16/465,326

(22) PCT Filed: Dec. 1, 2017

(86) PCT No.: PCT/US2017/064198
§ 371 (c)(1),
(2) Date: May 30, 2019

(87) PCT Pub. No.: WO2018/102674
PCT Pub. Date: Jun. 7, 2018

(65) Prior Publication Data
US 2019/0387771 A1      Dec. 26, 2019

Related U.S. Application Data

(60) Provisional application No. 62/429,217, filed on Dec. 2, 2016.

(51) Int. Cl.
*A23K 50/10* (2016.01)
*A23K 10/38* (2016.01)
*A23K 30/18* (2016.01)
*A23K 50/60* (2016.01)

(52) U.S. Cl.
CPC .............. *A23K 10/38* (2016.05); *A23K 30/18* (2016.05); *A23K 50/10* (2016.05); *A23K 50/60* (2016.05)

(58) Field of Classification Search
None
See application file for complete search history.

(56) References Cited

U.S. PATENT DOCUMENTS

| | | |
|---|---|---|
| 5,767,080 A | 6/1998 | Beck et al. |
| 6,114,609 A | 9/2000 | Beck et al. |
| 6,960,703 B2 | 11/2005 | Nagle et al. |
| 7,838,743 B1 | 11/2010 | Plehn et al. |
| 7,968,764 B2 | 6/2011 | Vermerris et al. |
| 9,994,919 B2 | 6/2018 | Chen et al. |
| 2003/0167987 A1 | 9/2003 | Nagel et al. |
| 2004/0180124 A1 | 9/2004 | Beck et al. |
| 2005/0076402 A1 | 4/2005 | Dale |
| 2007/0028331 A1 | 2/2007 | Coors et al. |
| 2008/0145476 A1 | 6/2008 | Beck |
| 2008/0215167 A1 | 9/2008 | Beck et al. |
| 2011/0280987 A1 | 11/2011 | Nestor |
| 2013/0019338 A1* | 1/2013 | Plehn ..................... A01H 5/10 800/275 |
| 2016/0153055 A1 | 6/2016 | Chen et al. |
| 2018/0000119 A1* | 1/2018 | Weiss ..................... A23K 10/38 |

FOREIGN PATENT DOCUMENTS

| | | |
|---|---|---|
| WO | 2011143157 | 11/2011 |
| WO | 2011153299 | 12/2011 |
| WO | 2016109633 | 7/2016 |

OTHER PUBLICATIONS

Cox, W. et al. Influence of Brown Midrib, Leafy, and Transgenic Hybrids on Corn Forage Production. Agronomy Journal 93(4)790-796 Jul. 2001. (Year: 2001).*
Coe et al. (2005) "Genetic, physical, maps, and database resources for maize" Maydica 50: 285-303.
Bian et al. (2006) "Brown leaf midrib mutants System in the silage maize" Maize Sciences, 14(2): 4-9.
Stinard "Three-point linkage data for fl2 bm3 su1 on 4S," Maize Genetics Cooperation Newsletter, 2000, 1 page.
Pajic (2007) "Breeding of maize types with specific traits at the Maize Research Institute, Zemun Polje" Genetika , 39(2): 169-180.
International Search Report and Written Opinon for PCT/US2017/064198, dated Mar. 19, 2018.
Taylor et al. (2005) "Corn Grain Endosperm Type and Brown Midrib 3 Corn Silage: Feeding Behavior and Milk Yield of Lactating Cows" Journal of Dairy Science, 88:1425-1433.
Taylor et al. (2005) "Corn Grain Endosperm Type and Brown Midrib 3 Corn Silage: Ruminal Fermentation and N Partitioning in Lactating Cows" Journal of Dairy Science, 88:1434-1442.
Taylor et al. (2005) "Corn Grain Endosperm Type and Brown Midrib 3 Corn Silage: Site of Digestion and Ruminal Kinetics in Lactating Cows" Journal of Dairy Science, 88: 1413-1424.
Tjardes et al. (2000) "Brown midrib-3 corn silage improves digestion but not performance of growing beef steers" Journal of Animal Science, 78:2957-2965.
Saunders et al. (2015) "Feeding brown midrib corn silage-based diet to growing beef steers improves growth performance and economic returns" Canadian Journal of Animal Science 95(4):625-631.
Keith et al. (1981) "Performance of feedlot cattle fed brown midrib-three or normal corn silage with various levels of additional corn grain" Journal of Animal Science, 52:8-13.
Weller et al. (1986) "The feeding value of normal and brown midrib-3 maize silage" Journal of Agriculture Science, 106:31-35.
Weller et al. (1984) "The nutritive value of normal and brown midrib-3 maize" Journal of Agriculture Science, 103:223-227.
Extended European Search Report for Application No. 17876494.0, dated Jun. 29, 2020.

(Continued)

*Primary Examiner* — Ralph J Gitomer

(57) ABSTRACT

A silage with increased digestibility is produced from a corn hybrid that includes both brown midrib (bmr) and floury traits. A growing ration comprises such silage. A finishing ration comprises such silage. A method of increasing the meat quantity of a silage-fed animal comprises providing a silage produced from a corn hybrid that includes brown midrib (bmr) and floury traits, and feeding the animal with an animal feed composition that comprises the silage.

8 Claims, No Drawings

(56) References Cited

OTHER PUBLICATIONS

Ovinge et al. (2019-B) Nebraska Beef Cattle Rpts.
Ovinge et al. (2019) Nebraska Beef Cattle Rpts.
Ovinge et al. (2018) Nebraska Beef Cattle Rpts.

* cited by examiner

METHODS OF USING SILAGE PRODUCED FROM A CORN HYBRID COMPRISING BROWN MIDRIB AND FLOURY TRAITS FOR MEAT PRODUCTION

CROSS-REFERENCE TO RELATED APPLICATIONS

This application is a national stage application, filed under 35 U.S.C. § 371, of International Patent Application No. PCT/US2017/064198, filed on Dec. 1, 2017, which claims the benefit of U.S. Provisional Application 62/429,217, filed on Dec. 2, 2016, each of which is incorporated by reference herein in its entirety.

TECHNICAL FIELD

The present disclosure relates generally to corn silage, animal feed compositions comprising corn silage, and methods of feeding animals with such animal feed composition.

BACKGROUND

Agriculturally important uses of corn (maize) include silage. Silage is fermented, high-moisture fodder that can be fed to ruminants. It is fermented and stored in a process called ensilage or silaging, and is usually made from corn or other grass crops, including sorghum or other cereals, using the entire green plant. Silage may be made, e.g., by placing cut green vegetation in a silo, by piling it in a large heap covered by plastic sheet, or by wrapping large bales in plastic film. The ensiled product retains a much larger proportion of its nutrients than if the crop had been dried and stored as hay or stover. Bulk silage is commonly fed to dairy cattle, while baled silage tends to be used for beef cattle, sheep, and horses. Corn silage is popular forage for ruminant animals because it is high in energy and digestibility and is easily adapted to mechanization from the stand-crop to time of feeding. Corn silage generally is slightly brown to dark green in color, and has a light, pleasant smell.

Feeding corn silage allows cattle feeders to take advantage of the entire corn plant at a time of maximum quality and tonnage, as well as to secure substantial quantities of roughage/grain inventory. Increased corn silage inclusion in the beef finishing diets during times of increased corn prices, can be an economical alternative compared to using corn. However, average daily gain (ADG) and G:F (gain:feed ratio) are not as favorable when the amount of corn silage inclusion in the beef finishing diets is increased. Generally, corn silage is included in finishing diet at no more than 15% of the diet dry matter (DM). Inclusion of distillers grains with elevated concentrations of corn silage in an animal feed composition provides less depression in performance compared to elevated concentrations of corn silage without inclusion of distillers grains. Feeding beef finishing diets containing 80% corn silage in combination with distillers grains has been shown as a potentially economical and efficient way to grow steers prior to the finishing phase. However, in such beef finishing diets, gut fill and fiber digestion limit dry matter intake (DMI) and thus ADG.

The brown midrib (bmr) mutation has been reported to lower lignin concentrations and improve fiber digestibility. Feeding corn silage containing bmr trait may enhance finishing performance, and offset the negative effects of feeding greater inclusions compared to traditional inclusions as a roughage source (i.e., 15% of the diet DM or less).

SUMMARY

Particular embodiments of the present disclosure relate to silage produced from a corn hybrid comprising brown midrib (bmr) and floury traits. Further embodiments of the present disclosure relate to growing rations that comprise silage produced from a corn hybrid having brown midrib (bmr) and floury traits.

Additional embodiments of the present disclosure relate to finishing rations that comprise silage produced from a corn hybrid having brown midrib (bmr) and floury traits. Yet further embodiments of the present disclosure relate to a method of increasing the meat quantity of a silage-fed animal. The method can comprise providing a silage produced from a corn hybrid that includes brown midrib (bmr) and floury traits; and feeding the animal with an animal feed composition that comprises the silage.

Provided are methods of increasing the meat quantity of a silage-fed animal includes the step of feeding the animal with an animal feed composition comprising a silage produced from a corn hybrid comprising brown midrib (bmr) and floury traits, thereby increasing the meat quantity of the silage-fed animal compared with a control animal fed a comparable diet comprising silage comprising the brown midrib (bmr) trait but not the floury trait. The brown midrib trait can be a brown-midrib-3 (bm3) gene and the floury trait can be a floury2 (fl2) gene. The foregoing and other features will become more apparent from the following detailed description of several embodiments.

DETAILED DESCRIPTION

I. Abbreviations

ADF acid detergent fiber
ADG average daily gain
BW body weight
bmr brown midrib
DM dry matter
DM % percent composition of the dry matter
DMI dry matter intake
G:F gain:feed ratio (inverse of F:G, or feed:gain ratio)
HCW hot carcass weight
MDGS modified distillers grains plus solubles
MS marbling score
NDF neutral detergent fiber
NDFD neutral detergent fiber digestibility
OM organic matter

II. Terms

Corn plant: As used herein, the term "corn plant" refers to a plant of the species, *Zea mays* (maize).

BMR silage: As used herein, the term "BMR silage" refers to the silage produced from a corn hybrid that contains a brown midrib (bmr) trait.

BMR-FL silage: As used herein, the term "BMR-FL silage" refers to the silage produced from a corn hybrid that contain both brown midrib (bmr) and floury traits.

CON silage: As used herein, the term "CON silage" refers to the silage produced from a wild type corn, which contains neither bmr nor floury trait.

Dry matter: As used herein, the term "dry matter" refers to any feedstuff, including forage.

Acid detergent fiber: As used herein the term "acid detergent fiber" or "ADF" refers to the insoluble residue remaining after boiling a feed sample in acid detergent.

Neutral detergent fiber: As used herein the term "neutral detergent fiber" or "NDF" refers to the insoluble residue remaining after boiling a feed sample in neutral detergent. The major components are lignin, cellulose and hemicellulose, but NDF also contains protein, bound nitrogen, minerals, and cuticle. NDF is a measure of slowly digested material across a wide range of feeds. NDF levels in forage increase as the plant matures. Average levels of NDF in grass silage may be approximately 55 percent DM (550 g/kg DM). The content of NDF in a total ration may be between 35-50% DM. Diets with less than 32% NDF may cause problems with acidosis. Diets that contain over 50% NDF may be restricted in their intake potential.

Digestibility: As used herein the term "digestability" refers to percentage of whole silage (ensiled stover and grain) or feed-ration components that is digested by animals. Greater digestibility is associated with higher energy intake.

Neutral detergent fiber digestibility: As used herein the term "neutral detergent fiber digestibility" or "NDFD" refers to percentage of neutral detergent fiber that is digestible. NDFD is determined in vitro by incubating a ground feed sample in live rumen fluid and measuring its disappearance to simulate the amount and rate of digestion that would occur in the rumen.

Silage: As used herein, the term "silage" refers to a certain type of storage forage. Generally, silage is made from plants (e.g., corn plants) in a process called ensilage. During this process, plants or plant parts undergo anaerobic fermentation caused by indigenous microorganisms (e.g., one or more strains of lactic acid bacteria, for example, *Lactobacillus* spec.) converting sugars to acids and exhausting any oxygen present in the crop material, which depletion of oxygen preserves the forage in conjunction with bacteria-generated volatile fatty acids, such as acetate, propionate, lactate, and butyrate. Silage is widely used for feeding milk and meat producing animals, such as dairy cattle and beef cattle.

Supplement: As used herein, the term "supplement" refers to any ingredient included in a feed mix to enhance the nutritional value of the feed mix. Commonly used supplements include protein (e.g., soybean meal or urea), minerals (e.g., bone meal), energy (e.g., animal fat), and vitamins.

Dry matter intake: As used herein, the term "dry matter intake" or "DMI" refers to the amount of feed (on a dry matter basis) that a steer consumes in a one-day period.

Average daily gain: As used herein, the term "average daily gain" refers to the rate of weight gain per day over a specified period of time.

Body weight: As used herein, the term "body weight" refers to the weight of a cow.

G:F: As used herein, the term "G:F" refers to the rate of weight gain per day over a specified period of time relative to how much dry matter is eater per day over the same specified period of time.

Hot carcass weight: As used herein, the term "hot carcass weight" refers to the weight of an unchilled carcass in pounds after the head, hide and internal organs have been removed.

Marbling score: As used herein, the term "marbling score" refers to the visible fat found between muscle fiber bundles within the ribeye muscle scored visually.

Dent Corn: corn whose kernels contain both hard and soft starch and become indented at maturity. Dent corn can be, for example, yellow dent corn which produces yellow kernels.

Percentages for rations and feeding, such as growing rations and finishing rations, are given as percentage by weight on a dry matter basis unless specified to the contrary.

III. Use of BMR-FL Silages in Animal Feed Compositions

A. Overview

Described herein are animal feed compositions suitable for feeding to a silage-fed animal, wherein the animal feed compositions comprise BMR-FL silage. BMR-FL silage is produced from a hybrid corn that includes both brown midrib (bmr) and floury traits. In some embodiments, BMR-FL silage is produced from a hybrid corn that comprises a brown-midrib-3 (bm3) gene and a floury2 (fl2) gene.

B. Brown Midrib (Bmr) Trait

Brown midrib (bmr) trait is characterized by a brown pigmentation in the leaf midrib at the V4 to V6 stage and a light brown coloration of the pith after tasseling. This trait is due to a bmr gene mutation that causes lower lignin content and higher fiber digestibility in corn plant tissue. Non-limiting examples of bmr mutation include a bm2 mutation or a bm3 mutation. The brown-midrib-3 gene ("bm3" gene) is located on the short arm of chromosome 4, and the bm3 allele is recessive. The brown-midrib-2 gene ("bm2" gene) is located on the long arm of chromosome 1, and the bm2 allele is also recessive.

Lignin polymers limit the digestibility of the fiber in the corn plant. The corn hybrid comprising bmr trait has a reduced lignin content, resulting in the silage with enhanced digestibility compared to the silage produced from conventional corn.

C. Floury Trait

Floury trait is characterized by a soft, starchy endosperm with irregularly shaped protein bodies and higher lysine content than conventional corn. Floury trait is known to increase digestibility in ruminants and to reduce the need for kernel processing at harvest.

Floury trait is reportedly associated with a mutation in one of the members of the zein gene family, the major prolamin storage proteins in maize seed. For example, floury trait may be due to fl2 gene mutation. Introgression of the fl2 mutation into corn lines is a time-consuming process. Phenotyping based on kernel vitreousness is difficult and often ambiguous, since the fl2 mutant allele is semi-dominant (Coleman 1997). Moreover, a rapid, gene-specific molecular assay is needed to detect the fl2 mutant allele and determine zygosity in candidate plants. See U.S. Patent Publication No. US 2016/0153055 A1.

D. Production of Silage

Ensilage compresses chopped silage. The cells of the corn plant are still alive and metabolically active, and ongoing metabolism by plant cells and microorganisms in the compressed silage forms carbon dioxide and heat by using air trapped in the ensiled plant material. Anaerobic metabolic conditions develop as the level of carbon dioxide in the silage increases. Desirable bacteria begin the fermentation process when plant respiration stops. If too much air is present, or if carbon dioxide escapes, an anaerobic condition may fail to develop. In this case, respiration may continue, and the respiring plant cells may use too much sugar and carbohydrates. This may waste nutrients needed by desirable bacteria to preserve the plant material as silage, and may yield an inferior silage. To avoid this undesirable effect, packing and covering of the silage immediately after filling may be important.

Once respiration by the plant cells ceases, acetic and lactic acids are produced by bacteria that feed on the available starches and simple sugars in the ensiled corn. To promote growth of desirable bacteria, the silage may contain a low amount of air having temperatures of between 80° F. and 100° F., and starches and sugars for food. Fermentation may continue until the acidity of the silage is high enough to stop bacterial growth.

Seepage may occur if moisture in the forage is excessively high. Seepage involves the drainage of leachate (excess moisture from silage and pulp) out of the silage, which generally enters the environment as a serious pollutant. Through seepage, desirable components (e.g., nitrogenous compounds, such as protein; and minerals) of the silage may be lost. Seepage generally reaches its peak on about the fourth day after ensiling. Therefore, to avoid, for example, the loss of desirable silage components from the silage, moisture content of forage going into the silo may be chosen to be sufficiently low to reduce or prevent seepage loss. However, silage that is too dry may not pack adequately, and may also exhibit a high loss of desirable components from the silage as a consequence of excessive fermentation and molding.

Plants may be ensiled at a dry matter content of about 30-40% to enable an optimal fermentation process, and to minimize losses during fermentation. To reach a dry matter content of about 30-40%, it may be desirable to let the plant material dry down in a field after mowing and before chopping with, for example, a forage harvester. When preparing corn silage, the grain is harvested together with the rest of the plant. To increase the availability of nutrients in the silage for uptake in the intestinal tract of a silage-fed animal, it may be desirable to crush the grain during the chopping process.

Harvested plant material may be transferred into a silo. Non-limiting examples of silos that may be useful for silage preparation include: a bunker silo, a silage heap, a concrete stave silo, or a tower silo. The plant material is compacted in the silo to remove air from the plant material, and enable anaerobic fermentation. It may be desirable to seal the silo with a plastic silage film, depending on the type of silo used. Use of a plastic cover on a trench silo, a bunker silo, or a large-diameter tower silo, may materially cut feed losses. Typically, the cover is applied immediately after the last load of plant material is packed in the silo, and the plastic covers are weighted to hold them firmly on the surface of the silage. Alternatively, the plant material may be prepared for fermentation during ensiling by baling the plant material, and wrapping the bales in silage film for sealing. On trench or bunker silos, it may be desirable to mound or crown the forage. This may facilitate drainage of rain water off the silo.

Additives may optionally be added to the plant material to improve fermentation. Examples of plant material additives that may be desirable in particular applications include microbial additives, such as *Lactobacillus* spp. and other inoculants; acids such as propionic acid, acetic acid or formic acid; or sugars. As will be readily understood by those of skill in the art, other methods for producing silage other than those specifically recited herein may also be used.

One advantage of silage production is that the process may have no influence on the composition, the amount, or availability of nutritive substances contained within the plant material used for producing the silage. On the contrary, purposes of the process itself are generally to both keep the quality of the plant material as it was prior to using such material for producing silage, and to preserve the positive properties of the plant material for an extended period of time. In this way, the plant material can be used as forage long after the plant material has been harvested.

Corn may be harvested for silage after the ear is well-dented, but before the leaves dry to the point that they turn brown. At this stage of growth, the ear may have accumulated most of its potential feeding value, but there may also have been little loss from the leaves and stalks. Thus, the quantity and quality of corn silage may be at its peak when the plant material is harvested during this stage. Ears usually will be well-dented when the ears are between 32-35% moisture. As time elapses after the ear has become well-dented, the feeding value of the plant material may decrease while field losses may increase. Corn harvested for silage at the milk stage (grain head releases a white liquid when opened) or dough stage (grain head begins to turn a doughy consistency) may yield less feed nutrients per acre than if it was harvested later. Plant material from corn may also ferment improperly in a silo if it is harvested too soon.

Maturity usually refers to the time when the ear has accumulated nearly all of its dry matter production potential. Temperatures during growth may influence the maturity rate of the grain, particularly during the autumn. For example, the ear's full dry matter potential may not be achieved if there are excessively cool temperatures and/or cloudy weather. Corn silage that is cut late and has brown and dead leaves and stalks may make adequate silage, but total production per acre may be sharply reduced. Significant field losses have been found when silage is made late into the fall or early winter. Also, a reduction in the amount of dry matter stored in the silo may be found with respect to silage that is cut late.

Corn that has been damaged, for example, by drought, high temperatures, blight, frost, or hail, may be salvaged for silage. However, the quality of such salvaged silage may not be as high as silage produced from undamaged corn that has reached the dent stage. The feeding value of the silage may depend upon both the state of the corn's development, and how the corn is handled after it has been damaged. Common observations of silage from immature corn include: higher moisture; fermentation in a different manner than mature corn; sour odor; and increased laxative effect. Corn that has experience from frost typically has a low carotene content. It will dry out quickly and lose leaves. Thus, it may be desirable to add water to corn that has frosted and become too dry. It may also be desirable to add water to drought corn.

It may be desirable for immature corn that has been damaged by extremely high temperatures to not be ensiled immediately. Immature, heat-damaged corn may never produce ears, but some additional stalk growth may result from delaying harvest. Additional stalk growth will result in additional feed. If corn is harvested for silage too soon after the plants have been extensively damaged by heat, the stalk may have too much moisture to produce a high-quality silage. Corn harvested too soon after extensive heat damage that has too much moisture may also lose nutrients through seepage.

Silage may also be produced from corn that has been damaged by leaf diseases such as the Southern Corn Leaf Blight. The Blight organism does not survive the ensiling process, and is further not believed to be toxic to silage-fed animals. However, in severe and unlikely cases, a secondary mold infection on damaged areas of the plant may produce a harmful toxin.

Possible problems with silage made from salvaged corn include its lack of energy content due to reduced grain formation, and improper fermentation resulting from excessive dryness of the damaged plant. As is known by those of skill in the art, these problems may be corrected, at least in part, by supplementation with an additional energy source, and addition of moisture, respectively.

Corn silage may be cut into particles that are ½" to ¾" in length. Particles of this size may pack more firmly, and may additionally be more palatable to silage-fed animals. Very finely cut silage that is shorter than ½" in length may be made with a recutter. Use of very finely cut silage increases the amount of dry matter that can be stored, e.g., in a silo. However, very finely cut silage may be less palatable to an animal that is to be fed the silage.

If silage is too dry, it may be desirable to add water, for example, to establish airtight conditions. Generally, four gallons (15.14 liters) of water may be added per ton (0.90 tonnes) of silage for each 1 percent desired rise in moisture content. It is understood that more or less water may be required, and measurements may be taken during the ensiling process to ensure that enough, but not too much, water is added. The water may be added as the silo is being filled. If the water is added after the silo is filled, it may seep down the silo walls, and therefore not permeate the silage mass. This seepage may cause leaching of silage nutrients, and may break the air seal and lead to improper fermentation.

Frozen silage may present a problem, particularly with respect to trench silos or bunker silos. While freezing does not impair the preservation of undisturbed silage, frozen silage may cause digestive disturbances when eaten by a silage-fed animal. Thus, it may be desirable to thaw silage before feeding it to an animal.

High-quality silage may be made without the addition of any additives or preservatives. However, additives may be added to silage to increase one or more characteristics of the silage. For example, molasses and grain may be added to corn forage at the time of ensiling.

With large-capacity silos and high-speed filling methods, distribution and packing of silage in silos should be monitored. Improper distribution and packing may cause excessive seepage, poor fermentation, and/or losses in storage capacity. Half the capacity of a cylindrical silo is in the silo's outermost edge. For example, for a cylindrical silo that is 14' in diameter, half its capacity is in the outermost 2' of its diameter. If material in this outside area is packed too loosely, the capacity of the silo may be significantly reduced. Thus, tower silos may be equipped with a distributor that facilitates proper silage distribution and packing.

A loss of nutrients occurs in all silage during the ensiling process, due to the presence of living microorganisms that carry out the fermentation process. The amount of nutritional value lost during the ensiling process depends upon, inter alia, the exclusion air during filling, and the prevention of carbon dioxide loss. Carbon dioxide is necessary to arrest respiration of the ensiled plant cells; and to prevent seepage loss, undesirable fermentation, and/or spoilage due to exposure of the plant material surface. Therefore, good ensiling practices generally lead to higher quality silage with a maximal nutrient content.

E. BMR-FL Silage in the Growing Rations

BMR-FL silage may be included in a growing ration to be fed to an animal during growing phase. In some embodiments, the growing ration comprises BMR-FL silage at about 80% of the diet DM, or at least 50%, 55%, 60%, 65%, 70%, 75%, 80%, 85%, 90% and 95% and less than 99%, 95%, 90%, 85%, 80%, 75% or 70% of the diet DM. In some embodiments, the growing ration comprises BMR-FL silage and distillers grains. In some embodiments, the growing ration may comprise or further comprise grain which is yellow dent corn, for example, in amounts of at least 5%, 10%, 15%, 20%, or 25%, and less than about 50%, 45%, 40%, 35%, 30%, 25%, 20%, 15% or 10% grain which is yellow dent corn. Optionally, the growing ration may further comprise supplements.

Example 1 evaluates the use of BMR-FL silage in a growing ration, as compared to BMR silage or CON silage. BMR-FL silage was produced from a corn hybrid (hybrid-F15578FX) that includes both bmr and floury traits. BMR silage was produced from a corn hybrid (hybrid-F15579S2) that includes only bmr trait. Hybrid variety F15578FX and hybrid variety F15579S2 are near isogenic hybrids having over 93% relatedness based on SNP markers. CON silage served as a control and was produced from a wild type corn (hybrid-TMR2R720), which comprises neither bmr nor floury trait. The results of nutrient and fermentation analyses for each tested silage (CON silage, BMR silage, or BMR-FL silage) are shown in Table 1. BMR-FL silage helps starch digestibility compared to BMR silage, but there is no difference between BMR and BMR-FL silages for OM, NDF, or ADF digestibility.

Table 2 shows the diet compositions for each treatment. "CON" treatment uses a growing ration comprising CON silage at 80% of the diet DM. For "BMR" or "BMR-FL" treatment, the growing ration comprises BMR or BMR-FL silage, respectively, at 80% of the diet DM.

Table 3 shows the comparative feeding performance of the three treatments (CON treatment, BMR treatment, and BMR-FL treatment). Feeding steers with growing ration comprising BMR-FL or BMR silage at 80% of the diet DM results in greater ending body weight (BW), DMI and ADG, when compared to the growing ration comprising CON silage at 80% of the diet DM. An increased gain when feeding steers with BMR-FL treatment leads to the steers with heavier BW out of the growing program or entering the feedlot, which could be advantageous in reducing total feed cost.

F. BMR-FL Silage in Finishing Rations

BMR-FL silage may be included in a finishing ration to be fed to an animal that will be used for production of meat or meat products. The finishing ration may comprise BMR-FL silage at from about 10% to about 45% of the diet DM, and more preferably from about 15% to about 45% of the diet DM. Thus, a finishing ration may comprise BMR-FL silage at, for example, at least 10%, 15%, 20%, 25%, 30%, 35%, 40%, or 45% of the diet DM by and less than about 100%, 95%, 90%, 85%, 80%, 75%, 70%, 65%, 60%, 55%, or 50% of the diet DM. In some embodiments, the finishing ration comprises BMR-FL silage and distillers grains. In some embodiments, the finishing ration may comprise or further comprise grain which is yellow dent corn, for example in amounts of at least 5%, 10%, 15%, 20%, 25%, 30%, 40%, 45% or 50%, and less than 95%, 90%, 85%, 80%, 75%, 70%, 65%, 60%, 55%, 50%, 45%, 40%, 35%, 30%, 25%, 20%, 15% or 10% grain which is yellow dent corn. Optionally, the finishing ration may further comprise supplements. A finishing ration may be fed to an animal from about four to about six months before harvest.

In some examples, a finishing ration comprising less than 60% dry matter is produced. In further examples, a finishing ration comprises less than 55% dry matter. In some specific examples, a finishing ration comprises less than 50% dry matter. Thus, a finishing ration may comprise, for example, 59%, 58%, 57%, 56%, 55%, 54%, 53%, 52%, 51%, 50%, 49%, 48%, 47%, 46%, 45%, 44%, 43%, 42%, 41%, or 40% dry matter.

Example 2 evaluates the use of BMR-FL silage in a finishing ration, as compared to BMR silage or CON silage. BMR-FL silage was produced from a corn hybrid (hybrid-F15578FX) that includes both bmr and floury traits. BMR silage was produced from a corn hybrid (hybrid-F15579S2) that includes only bmr trait. CON silage served as a control and was produced from a wild type corn (hybrid-TMR2R720), which comprises neither bmr nor floury trait. The results of nutrient and fermentation analyses for each tested silage (CON silage, BMR silage, or BMR-FL silage) are shown in Table 4.

Table 5 shows the diet compositions for each treatment. The three silages (CON, BMR and BMR-FL silages) were fed at either 15% or 45% of diet DM for finishing steers. "CON" treatment used a finishing ration comprising CON silage. "BMR" or "BMR-FL" treatment used the growing ration comprising BMR or BMR-FL silage, respectively. An interaction was observed between the type of silage and the amount of silage inclusion.

Table 6 shows the effects of silage type and inclusion amount on feedlot performance and carcass characteristics in calf fed steers.

At 15% silage inclusion, the finishing ration comprising BMR-FL silage provides a significantly greater body weight (BW), hot carcass weight (HCW), averaged day gain (ADG), and gain:feed (G:F) ratio, compared to the finishing ration comprising BMR or CON silage. Steers fed BMR or CON silage show about the same ADG; however, steers fed BMR silage have a higher G:F than steers fed CON silage.

At 45% silage inclusion, the finishing ration comprising BMR-FL silage provides similar performance as the finishing ration comprising BMR silage. However, both of these finishing rations provide greater final BW, HCW, and ADG when compared to the finishing ration comprising CON silage.

Surprisingly, steers fed BMR silage show a higher G:F ratio (i.e., lower F:G ratio) than steers fed BMR-FL silage when fed at 45% silage inclusion. This result is opposite to the G:F ratio at 15% silage inclusion, wherein steers fed BMR-FL silage show a higher G:F ratio (i.e., lower F:G ratio) than steers fed BMR silage. Steers fed BMR-FL silage at 45% silage inclusion show about similar feedlot performance and carcass characteristics, as compared to steers fed CON silage, at 15% silage inclusion. Therefore, BMR-FL silage allows for a higher inclusion amount without negative impact on feedlot performance or carcass characteristics. Accordingly, the BMR-FL silage offers flexibility and potential financial benefits.

Furthermore, the ADG observed for steers fed BMR-FL silage-containing finishing ratio are approximately equivalent to the ADG observed for steers fed a comparable finishing ration that composed of grain corn (i.e., no corn silage) as an energy source. This unexpected finding demonstrates that BMR-FL silage can effectively replace grain corn in a beef finishing ration.

G. Metabolism of Growing Ration Comprising BMR-FL Silage

Example 3 evaluates the effect of BMR-FL silage in the growing ration on nutrient digestibility and ruminal fermentation characteristics, as compared to BMR silage or CON silage. BMR-FL silage was produced from a corn hybrid (hybrid-F15578FX) that includes both bmr and floury traits. BMR silage was produced from a corn hybrid (hybrid-F1557952) that includes only bmr trait. CON silage served as a control and was produced from a wild type corn (hybrid-TMR2R720), which comprises neither bmr nor floury trait. The results of nutrient and fermentation analyses for each tested silage (CON silage, BMR silage, or BMR-FL silage) are shown in Table 7. BMR-FL silage helps starch digestibility compared to BMR silage, but there is no difference between BMR and BMR-FL silages for OM, NDF, or ADF digestibility.

Table 8 shows the diet compositions for each treatment. "CON" treatment uses a growing ration comprising CON silage at 80% of the diet DM. For "BMR" or "BMR-FL" treatment, the growing ration comprises BMR or BMR-FL silage, respectively, at 80% of the diet DM.

Table 9 shows the effect of feeding different treatment on intake and digestibility of nutrients. The type of treatment (CON, BMR or BMR-FL treatment) tends to impact DMI and OM intake (P=0.11), with steers fed BMR and BMR-FL treatment having greater intake than steers fed CON treatment.

OM digestibility is also impacted by the type of treatment (P=0.06), with steers fed BMR-FL treatment having greater (P<0.05) OM digestibility than steers fed CON treatment, and steers fed BMR treatment being intermediate.

Steers fed BMR treatment (58.4%) or BMR-FL treatment (53.2%) had greater (P<0.01) NDF digestibility compared to the steers fed CON treatment (46.5%). There was no difference (P>0.10) in NDF digestibility between BMR treatment (58.1%) and BMR-FL treatment (53.2%).

Steers fed BMR treatment (58.1%) or BMR-FL treatment (53.3%) had greater (P<0.01) ADF digestibility compared to the steers fed CON treatment (40.8%). There were no differences (P>0.10) in ADF digestibility between BMR treatment (58.1%) and BMR-FL treatment (53.3%).

Table 10 shows the effects of treatment type on corn bran and silage in situ NDF digestibility. In situ NDF disappearance was greater (P<0.01) for samples incubated in steers fed BMR or BMR-FL treatment, compared to samples incubated in steers fed CON treatment.

Table 11 shows the effects of treatment type on rumen pH and gas production rate. Steers fed BMR treatment showed an averaged rumen pH of 6.22, and steers fed BMR treatment showed an averaged rumen pH of 6.26. Steers fed CON treatment showed an averaged rumen pH of 6.50, which was higher than those of BMR or BMR-FL treatment.

Based on rumen pH, gas production, and in situ NDF disappearance of incubated feeds, a greater fermentation and a more suitable rumen environment is likely for steers fed BMR-FL or BMR treatment when compared to steers fed CON treatment.

EXAMPLES

Example 1. Evaluation of the Growing Ration Comprising BMR-FL Silage

Three hybrids of corn silage were grown and harvested at the Eastern Nebraska Research and Extension Center (ENREC) near Mead, Nebr. Three types of corn silage were tested: CON silage, BMR silage, and BMR-FL silage. CON silage served as the control and was produced from a corn hybrid-TMR2R720, which contained neither bmr nor floury traits. BMR silage was produced from a corn hybrid-F15579S2, which contained only bmr trait. BMR-FL silage was produced from a corn hybrid-F15578FX, which contained both bmr and floury traits. Silage were harvested from Sep. 11, 2015 through Sep. 16, 2015, and stored in concrete wall bunkers until the initiation of the trial. Bunker samples were sampled for dry matter (DM) and fermentation analysis at 28 days after harvesting to ensure proper ensiling. All feeds were sampled weekly for DM, and monthly composites were analyzed for nutrients.

Silage was targeted to be harvested at 35% DM. However, after fermentation, DM declined slightly (Table 1). The fermentation analysis of the three silages indicated that proper fermentation did occur as pH was below 3.9, as well as having total acids greater than 7.3%. The starch percentage and the sugar (water soluble carbohydrates) percentage remained consistent across all three silages. The ADF and lignin concentrations were numerically lower in both BMR and BMR-FL silages compared to CON silage, as expected.

TABLE 1

Nutrient and fermentation analysis of the three silages

| Nutrient[1] | CON Silage | | BMR Silage | | BMR-FL Silage | |
|---|---|---|---|---|---|---|
| | Mean | CV[2] | Mean | CV[2] | Mean | CV[2] |
| DM, % | 31.9 | 6.4 | 32.4 | 5.3 | 33.0 | 6.9 |
| CP, % | 8.6 | 3.4 | 9.6 | 7.8 | 9.1 | 3.9 |
| NDF, % | 40.9 | 4.3 | 41.0 | 4.4 | 39.0 | 3.6 |
| ADF, % | 27.1 | 2.5 | 26.7 | 2.2 | 23.6 | 3.0 |
| Lignin, % | 4.3 | 27.5 | 3.7 | 24.2 | 2.81 | 34.6 |
| Starch, % | 31.0 | 8.8 | 32.0 | 8.9 | 30.8 | 6.7 |
| Sugar, % | 2.3 | 28.1 | 2.4 | 37.8 | 2.8 | 22.4 |
| PH | 3.89 | 2.5 | 3.86 | 1.9 | 3.81 | 6.3 |
| Lactic Acid, % | 5.6 | 17.1 | 6.2 | 16.6 | 6.0 | 15.6 |
| Acetic acid, % | 1.4 | 31.2 | 1.6 | 30.9 | 1.5 | 34.4 |
| Propionic acid, % | 0.34 | 40.5 | 0.43 | 48.7 | 0.46 | 0.54 |
| Butyric acid, % | <0.01 | 0.0 | <0.01 | 0.0 | <0.01 | 0.0 |
| Total acids, % | 7.3 | 10.4 | 8.2 | 11.0 | 7.9 | 10.8 |

[1]DM was calculated using weekly samples and oven dried for 48 hours at 60° C. All other nutrient assays are based on monthly composites of weekly samples taken during the finishing trial, and analyzed at Dairy One Labs (Ithaca, NY)
[2]C.V. = Coefficient of variation and is calculated by dividing the standard deviation by the mean and is expressed as a percentage A 76-day growing study was conducted utilizing 216 yearling crossbred steers (initial BW=714±22 lb). All steers were limit-fed a common diet consisting of 50% alfalfa hay and 50% SweetBran® at 2% of BW for five days prior to trial initiation to minimize gut fill. Following five days of limit feeding, steers were weighed for two consecutive days. Initial BW was calculated by averaging the two-day weights. Cattle were implanted with Ralgro® during initial processing. Cattle were stratified by BW and assigned randomly to pens with 12 steers per pen. Pens were assigned randomly to one of three treatments, with six (6) replications per treatment. Ending BW was collected similar to initial BW with steers limit-fed at 2% of BW for five days and weighed for two consecutive days The three treatments (Table 2) were set up in a generalized randomized block design. In "CON" treatment, steers were fed a growing ration that comprises CON silage at 80% of the diet DM. In "BMR" or "BMR-FL" treatment, steers were fed a growing ration that comprises BMR or BMR-FL silage, respectively, at 80% of the diet DM. All diets included 15% modified distillers grains plus solubles (MDGS) and 5% supplement. Supplement consisted of 3.0% fine ground corn, 0.916% limestone, 0.574% urea, 0.125% tallow, 0.30% salt, 0.05% trace mineral package (10% Mg, 6% Zn, 4.5% Fe, 2% Mn, 0.05% Cu, 0.3% I, and 0.05% Co), 0.015% Vitamin A-D-E package (1,500 IU of vitamin A, 3,000 IU of vitamin D, 3.7 IU of vitamin E) as percentages of the final diet (DM basis). Supplement was formulated to provide 200 mg/steer of Rumension® daily.

TABLE 2

Diet Compositions for each treatment (DM basis) fed to growing steers

| | Treatment | | |
|---|---|---|---|
| Ingredient | CON | BMR | BMR-FL2 |
| Control silage | 80.0 | — | — |
| BMR silage | — | 80.0 | — |
| BMR-FL silage | — | — | 80.0 |
| Modified distillers grains plus solubles | 15.0 | 15.0 | 15.0 |
| Supplement | 5.0 | 5.0 | 5.0 |

Performance data (BW, DMI, ADG, and G:F) were analyzed using the MIXED procedure of SAS (SAS Institute, Inc., Cary, N.C.) with pen serving as the experimental unit. Block was included in the model as a fixed effect. One steer died during the study on the BMR treatment due to pneumonia and was removed from the data.

TABLE 3

Effects of each treatment on growing steer performance

| | Treatment | | | | |
|---|---|---|---|---|---|
| Variable | CON | BMR | BMR-FL | SEM | P-value |
| Initial BW, lb | 714 | 713 | 714 | 0.7 | 0.80 |
| Ending BW, lb | 989[b] | 1035[a] | 1032[a] | 4.9 | <0.01 |
| DMI, lb/d | 21.2[b] | 24.0[a] | 24.1[a] | 0.2 | <0.01 |
| ADG, lb | 3.62[b] | 4.23[a] | 4.19[a] | 0.06 | <0.01 |
| Feed:Gain[1] | 5.86 | 5.67 | 5.74 | — | 0.26 |

[a,b,c]Means with different superscripts differ (P < 0.05)
[1]Feed: Gain was analyzed as gain to feed, the reciprocal of feed:gain Table 3 summarized performance data of the three treatments (CON treatment, BMR treatment, and BMR-FL treatment). Ending BW was greater (P<0.01) for steers fed BMR or BMR-FL treatment compared to steers fed CON treatment. There was no difference in ending BW between steers fed BMR or BMR-FL treatment. Steers fed BMR or BMR-FL treatment had greater (P<0.01) DMI and ADG compared to steers fed CON treatment. There was no difference in DMI or ADG for steer fed BMR or BMR-FL treatment. While BMR and BMR-FL treatment had greater DMI and ADG, there were no differences (P=0.26) in F:G between the three treatments.

Example 2. Evaluation of the Finishing Ration Comprising BMR-FL Silage

Three hybrids of corn silage were grown and harvested at the Eastern Nebraska Research and Extension Center (ENREC) near Mead, Nebr. Three types of corn silage were tested: CON silage, BMR silage, and BMR-FL silage. CON silage served as the control and was produced from a corn hybrid-TMR2R720, which contained neither bmr nor floury traits. BMR silage was produced from a corn hybrid-F15579S2, which contained only bmr trait. BMR-FL silage was produced from a corn hybrid-F15578FX, which contained both bmr and floury traits. Silage was harvested from Sep. 11, 2015 through Sep. 16, 2015, and stored in concrete wall bunkers until the initiation of the trial. Bunker samples were sampled for dry matter (DM) and fermentation analysis at 28 days after harvesting to ensure proper ensiling. All feeds were sampled weekly for DM, and monthly composites were analyzed for nutrients.

Corn silage was targeted to be harvested at 35% DM. However, after fermentation, the DM content declined slightly (Table 4). The fermentation analysis of the three silages indicated that proper fermentation did occur as pH was below 3.9, as well as having total acids greater than 7.3%. The starch percentage and the sugar (water soluble carbohydrates) percentage remained consistent across all three silages. The acid detergent fiber (ADF) and lignin concentrations were numerically lower in both BMR and BMR-FL silages compared to CON silage, as expected.

Total of 360 crossbred steers were received as calves. After a 28-day receiving process, the steers having an average body weight (BW) of 334±25 kg were sorted into three BW blocks and assigned randomly to one of 36 pens (10 steers/pen). The light BW block contained three (3) replications, the middle BW block contained two (2) replications, and the heaviest BW block contained one (1) replication. All steers were limit-fed a common diet consisting of 50% alfalfa hay and 50% SweetBran® at 2% of BW for five days prior to trial initiation to minimize gut fill, prior to weighing two consecutive days. Initial BW was calculated by averaging the two-day weights.

Treatments were designed as a 2×3 factorial arrangement that consisted of inclusion of silage in the finishing diet at two different amounts (15% inclusion or 45% inclusion on a DM basis) and using three types of silage (CON, BMR, or BMR-FL silage; Table 5).

Silage fed at 45% of diet DM in the finishing ration replaced a 50:50 blend of dry-rolled and high-moisture corn compared to 15% silage treatments (Table 5). All steers were fed a supplement formulated for 30 g/ton of Rumensin® (Elanco Animal Health, DM basis) and a targeted intake of 90 mg/steer daily of Tylan® (Elanco Animal Health). Steers were implanted with Component TE-IS® (Elanco Animal Health) on the first day (day 1), and re-implanted with Component TE-200® (Elanco Animal Health) on day 91. Steers were fed for 173 days before harvest. Prior to shipping to a commercial abattoir, pens of steers were weighed on a platform scale for live final BW measurements. A 4% pencil shrink was applied to this weight for final live BW, and calculation of dressing percentage (HCW/shrunk live final BW). Steers were weighed the afternoon prior to evening shipping, and harvested the following morning. At the day of harvest, hot carcass weight (HCW) were recorded, and carcass adjusted final BW was calculated from HCW adjusted to the overall common dressing percentage (63.8%). Carcass-adjusted final BW was used to calculate ADG and G:F values. Marbling score, $12^{th}$ rib fat thickness, and LM area were recorded after a 48-hour chill.

Data were analyzed using the MIXED procedure of SAS (SAS Institute, Inc., Cary, N.C.) with pen serving as the experimental unit and block as a fixed effect. The treatment design was a 2×3 factorial; therefore, data were first evaluated for an interaction between hybrid and inclusion. If a significant interaction was observed for performance variables, then simple effects of hybrid within either 15 or 45% inclusion were evaluated.

There was interaction between the amount of silage inclusion and the type of silage for final live BW, ADG, G:F, dressing percentage, and HCW (P≤0.05); therefore, simple effects will be presented (Table 6). No interaction was observed between the amount of silage inclusion and the type of silage for dry matter intake (DMI). Steers fed 45% silage inclusion averaged a greater DMI (P<0.01) compared to steers fed 15% silage inclusion, regardless the type of silage. The type of silage did not significantly affect DMI (P=0.11).

At 15% silage inclusion of the diet DM, steers fed BMR-FL silage had greater ADG than steers fed CON or BMR silage. At 45% silage inclusion of the diet DM, steers fed BMR-FL or BMR silage gained similarly, but both were greater than steers fed CON silage (P<0.05). Interestingly, steers fed BMR-FL or BMR silage at 45% of the diet DM had similar ADG to steers fed either 15% CON or BMR silage inclusion. This suggested that the bmr trait dramatically improved digestibility and gain, allowing for more BMR-FL or BMR silage to be fed without compromising ADG.

All treatments with 15% silage inclusion had higher (P≤0.04) G:F compared to the treatments with 45% c silage inclusion. However, the G:F response to silage type was different depending on inclusion. For steers fed 15% silage inclusion, G:F was greatest for BMR-FL treatment, lowest for BMR treatment and intermediate for CON treatment (P<0.05). The range in G:F across the three treatments was 1:5.92 to 1:5.63. For steers fed 45% silage inclusion, G:F was greatest for steers fed BMR (P<0.05), while CON and BMR-FL treatments were not different. The range in G:F across the three treatments was 1:6.38 to 1:6.09.

At 15% silage inclusion, hot carcass weight (HCW) was greater (P<0.01) for steers fed BMR-FL treatment compared to steers fed CON or BMR treatment, but similar between steers fed BMR or CON treatment. At 45% silage inclusion, steers fed BMR-FL or BMR treatment had similar HCW, but were both heavier (P<0.01) compared to steers fed CON treatment. Steers fed 15% silage inclusion had heavier (P<0.01) HCW compared to steers fed 45% silage inclusion, regardless the type of silage. No significant interaction was observed for final live BW (P=0.49). When CON silage was fed at 45% inclusion of diet DM, live final BW was reduced 16 lb. compared to feeding CON at 15% inclusion. However, HCW was reduced by 27 lb. when CON silage was fed at 45% inclusion compared to 15% inclusion. This relative change in HCW compared to final live BW illustrates the negative effect of increasing silage inclusion from 15% to 45% of diet DM on dressing percentage and gut fill. Dressing percentage at 15% silage inclusion was greatest (P<0.03) for steers fed BMR-FL treatment and lowest for steers fed CON treatment, with steers fed BMR treatment being intermediate. However, at 45% silage inclusion, steers fed BMR-FL or BMR treatment had dramatically greater (P<0.01) dressing percentages than steers fed CON treatment. All steers fed 15% silage inclusion had greater (P<0.01) dressing percentages compared to steers fed 45% silage inclusion.

Steers fed 15% silage inclusion had greater (P<0.01) fat thickness over the $12^{th}$ rib and marbling score compared to steers fed 45% silage inclusion in the finishing diet. Fat thickness and marbling generally followed ADG responses.

Feeding finishing steers with BMR-FL silage at 15% of the diet DM resulted in greater final BW, HCW, ADG and higher G:F, as compared to feeding with BMR and CON silage, which was unexpected. At 15% silage inclusion, steers fed BMR silage and steers fed CON gained the same, but steers fed BMR silage had higher G:F than steers fed CON silage.

When the finishing ratio comprises silage at 45% of the diet DM, steers fed BMR-FL or BMR silage resulted in similar, but greater final BW, HCW, and ADG when compared to steers fed CON silage. Steers fed BMR silage had a higher G:F ratio than steers fed BMR-FL silage when fed at 45% silage inclusion, which is opposite to the result at 15% silage inclusion. Thus, feeding silage with the bmr trait improved feedlot performance and carcass characteristics compared to non-bmr silage when fed at 45% silage inclusion and likely had little impact when fed at 15% silage inclusion.

TABLE 4

Nutrient and fermentation analysis of the three silages

| Nutrients[1] | CON Silage Mean | $CV^2$ | BMR Silage Mean | $CV^2$ | BMR-FL Silage Mean | $CV^2$ |
|---|---|---|---|---|---|---|
| DM, % | 33.3 | 6.2 | 33.2 | 5.4 | 34.1 | 5.7 |
| CP, % | 8.6 | 3.4 | 9.6 | 7.8 | 9.1 | 3.9 |
| NDF, % | 40.9 | 4.3 | 41.0 | 4.4 | 39.0 | 3.6 |
| ADF, % | 27.1 | 2.5 | 26.7 | 2.2 | 23.6 | 3.0 |
| Lignin, % | 4.3 | 27.5 | 3.7 | 24.2 | 2.81 | 34.6 |
| Starch, % | 31.0 | 8.8 | 32.0 | 8.9 | 30.8 | 6.7 |
| Sugar, % | 2.3 | 28.1 | 2.4 | 37.8 | 2.8 | 22.4 |
| pH | 3.89 | 2.5 | 3.86 | 1.9 | 3.81 | 6.3 |
| Lactic Acid, % | 5.6 | 17.1 | 6.2 | 16.6 | 6.0 | 15.6 |
| Acetic acid, % | 1.4 | 31.2 | 1.6 | 30.9 | 1.5 | 34.4 |
| Propionic acid, % | 0.34 | 40.5 | 0.43 | 48.7 | 0.46 | 54.0 |
| Butyric acid, % | <0.01 | 0.0 | <0.01 | 0.0 | <0.01 | 0.0 |
| Total acids, % | 7.3 | 10.4 | 8.2 | 11.0 | 7.9 | 10.8 |

[1]DM was calculated using weekly samples and oven dried for 48 hours at 60° C. All other samples are based on monthly composites of weekly samples taken during the finishing trial, and analyzed at Dairy One Labs (Ithaca, NY)
[2]C.V. = coefficient of variation and is calculated by dividing the standard deviation by the mean and is expressed as a percentage

TABLE 5

Diet compositions for each treatment (DM basis) fed to finishing steers

| | 15% Silage Inclusion | | | 45% Silage Inclusion | | |
|---|---|---|---|---|---|---|
| Ingredient | CON | BMR | BMR-FL | CON | BMR | BMR-FL |
| Control silage | 15.0 | — | — | 45.0 | — | — |
| BMR silage | — | 15.0 | — | — | 45.0 | — |
| BMR-FL silage | — | — | 15.0 | — | — | 45.0 |
| MDGS | 20.0 | 20.0 | 20.0 | 20.0 | 20.0 | 20.0 |
| Dry rolled corn | 30.5 | 30.5 | 30.5 | 15.5 | 15.5 | 15.5 |
| High moisture corn | 30.5 | 30.5 | 30.5 | 15.5 | 15.5 | 15.5 |
| Supplement[1] | | | | | | |
| Fine ground corn | | 1.333 | | | 1.083 | |
| Limestone | | 1.675 | | | 1.675 | |
| Salt | | 0.300 | | | 0.300 | |
| Urea | | 0.500 | | | 0.750 | |
| Tallow | | 0.100 | | | 0.100 | |
| Beef Trace Mineral[2] | | 0.050 | | | 0.050 | |
| Vitamin A-D-E[3] | | 0.015 | | | 0.015 | |
| Rumensin-90[4] | | 0.0165 | | | 0.0165 | |
| Tylan-40[4] | | 0.0102 | | | 0.0102 | |

[1]Supplement was fed at 4.0% of diet DM
[2]Beef trace mineral (10% Mg, 6% Zn, 4.5% Fe, 2% Mn, 0.05% Cu, 0.3% I, and 0.05 Co)
[3]Vitamin A-D-E package (1,500 IU of vitamin A, 3,000 IU of vitamin D, 3.7 IU of vitamin E)
[4]Formulated to provide 30 g/ton of Rumensin and 90 mg/steer/day of Tylan

TABLE 6

The effects of silage type and inclusion amount on feedlot performance and carcass characteristics in calf fed steers

| | Treatments with 15% silage | | | Treatments with 45% silage | | | SEM | Int.[1] | Concentration[2] | Hybrid[3] |
|---|---|---|---|---|---|---|---|---|---|---|
| | CON | BMR | BMR-FL2 | CON | BMR | BMR-FL2 | | | | |
| Feedlot performance | | | | | | | | | | |
| Initial BW, lb | 736 | 735 | 736 | 735 | 736 | 737 | 0.7 | 0.49 | 0.57 | 0.36 |
| Final BW[4], lb | 1382[b] | 1380[b] | 1407[a] | 1339[c] | 1372[b] | 1374[b] | 6.7 | 0.04 | <0.01 | <0.01 |
| DMI, lb/d | 21.5 | 22.1 | 21.8 | 22.3 | 22.4 | 23.0 | 0.3 | 0.19 | <0.01 | 0.11 |
| ADG[5], lb | 3.73[b] | 3.73[b] | 3.88[a] | 3.49[c] | 3.67[b] | 3.68[b] | 0.04 | 0.05 | <0.01 | <0.01 |
| Feed:Gain[5] | 5.77[b] | 5.92[c] | 5.63[a] | 6.38[e] | 6.09[d] | 6.26[e] | — | 0.01 | <0.01 | 0.45 |
| Live Final BW, lb | 1377 | 1373 | 1389 | 1361 | 1370 | 1372 | 6.4 | 0.49 | 0.03 | 0.15 |
| Carcass Characteristics | | | | | | | | | | |
| HCW, lb | 882[b] | 880[b] | 898[a] | 855[c] | 875[b] | 877[b] | 4.3 | 0.04 | <0.01 | <0.01 |
| Dress, % | 64.05[b] | 64.15[a,b] | 64.64[a] | 62.75[c] | 63.89[b] | 63.87[b] | 0.19 | 0.03 | <0.01 | <0.01 |
| LM area, in² | 13.5 | 13.6 | 13.6 | 13.8 | 14.0 | 13.5 | 0.1 | 0.08 | 0.11 | 0.29 |
| 12th rib fat, in | 0.56 | 0.55 | 0.59 | 0.47 | 0.49 | 0.52 | 0.02 | 0.76 | <0.01 | 0.23 |
| Marbling score[6] | 451 | 455 | 475 | 413 | 425 | 443 | 10.0 | 0.90 | <0.01 | 0.03 |

[a,b,c,d,e]Means with different superscripts differ (P < 0.05).
[1]Silage Concentration x Silage hybrid interaction
[2]Fixed effect of silage concentration
[3]Fixed effect of silage hybrid
[4]Final BW calculated based on HCW/common dressing percent of 63.8%
[5]F:G was analyzed as gain to feed
[6]Marbling score 400 = small[00], 500 = modest[00]

Example 3. Evaluation of BMR-FL Silage in Growing Ration on Nutrient Digestibility and Ruminal Fermentation Three hybrids of corn silage were grown and harvested at the Eastern Nebraska Research and Extension Center (EN-REC) near Mead, Nebr. Three types of corn silage were tested: CON silage, BMR silage, and BMR-FL silage. CON silage served as the control and was produced from a corn hybrid-TMR2R720, which contained neither bmr nor floury traits. BMR silage was produced from a corn hybrid-F15579S2, which contained only bmr trait. BMR-FL silage was produced from a corn hybrid-F15578FX, which contained both bmr and floury traits. Silage were harvested from Sep. 11, 2015 through Sep. 16, 2015, and stored in concrete wall bunkers until the initiation of the trial. Bunker samples were sampled for dry matter (DM) and fermentation analysis at 28 days after harvesting to ensure proper ensiling. All feeds were sampled weekly for DM, and monthly composites were analyzed for nutrients.

Corn silage was targeted to be harvested at 35% DM. However, after fermentation, the DM content declined slightly (Table 7). The fermentation analysis of the three silages indicated that proper fermentation did occur as pH was below 3.9, as well as having total acids greater than 7.3%. The starch percentage and the sugar (water soluble carbohydrates) percentage remained consistent across all three silages. The acid detergent fiber (ADF) and lignin concentrations were numerically lower in both BMR and BMR-FL silages compared to CON silage, as expected.

TABLE 7

Nutrient and fermentation analysis of the three silages

| Nutrient[1] | CON Silage Mean | CV2 | BMR Silage Mean | CV2 | BMR-FL Silage Mean | CV2 |
|---|---|---|---|---|---|---|
| DM, % | 31.9 | 6.4 | 32.4 | 5.3 | 33.0 | 6.9 |
| CP, % | 8.6 | 3.4 | 9.6 | 7.8 | 9.1 | 3.9 |
| NDF, % | 40.9 | 4.3 | 41.0 | 4.4 | 39.0 | 3.6 |
| ADF, % | 27.1 | 2.5 | 26.7 | 2.2 | 23.6 | 3.0 |
| Lignin, % | 4.3 | 27.5 | 3.7 | 24.2 | 2.81 | 34.6 |
| Starch, % | 31.0 | 8.8 | 32.0 | 8.9 | 30.8 | 6.7 |
| Sugar, % | 2.3 | 28.1 | 2.4 | 37.8 | 2.8 | 22.4 |
| pH | 3.89 | 2.5 | 3.86 | 1.9 | 3.81 | 6.3 |
| Lactic Acid, % | 5.6 | 17.1 | 6.2 | 16.6 | 6.0 | 15.6 |
| Acetic acid, % | 1.4 | 31.2 | 1.6 | 30.9 | 1.5 | 34.4 |
| Propionic acid, % | 0.34 | 40.5 | 0.43 | 48.7 | 0.46 | 0.54 |
| Butyric acid, % | <0.01 | 0.0 | <0.01 | 0.0 | <0.01 | 0.0 |
| Total acids, % | 7.3 | 10.4 | 8.2 | 11.0 | 7.9 | 10.8 |

[1]DM was calculated using weekly samples and oven dried for 48 hours at 60° C. All other nutrient assays are based on monthly composites of weekly samples taken during the finishing trial, and analyzed at Dairy One Labs (Ithaca, NY)
[2]C.V. = coefficient of variation and is calculated by dividing the standard deviation by the mean and is expressed as a percentage Six steers having an averaged initial BW of 604±60 lb were used in a replicated 3×6 Latin rectangle with three treatments (CON, BMR, and BMR-FL treatment; Table 8) for each period, for six periods. Steers were assigned randomly to one of three treatments using a row×column transformation. For CON treatment, a diet comprising CON silage at 80% of the diet DM was fed to growing steers. For BMR or BMR-FL treatment, a diet comprising BMR or BMR-FL silage, respectively, at 80% of the diet DM was fed to growing steers.

All treatments included 80% silage (CON, BMR or BMR-FL silage), 15% modified distillers grains plus solubles (MDGS), and 5% supplement of the diet DM. Supplement consisted of 3.0% fine ground corn, 0.916% limestone, 0.574% urea, 0.125% tallow, 0.30% salt, 0.05% trace mineral package (10% Mg, 6% Zn, 4.5% Fe, 2% Mn, 0.05% Cu, 0.3% I, and 0.05 Co), 0.015% Vitamin A-D-E package (1,500 IU of vitamin A, 3,000 IU of vitamin D, 3.7 IU of vitamin E) as percentages of the final diet (DM basis). Rumensin was added in the supplement to supply 200 mg/steer daily. Each period was 21 days in length consisting of 16-day adaptation and a 5-day collection. Diets were mixed twice weekly and stored in a cooler (32° F.) to ensure fresh feed. Steers were fed at 8:00 hours daily and had ad libitum access to their treatment diets and water throughout each period. Titanium dioxide was dosed intraruminally on day 10 to day 20 as a marker to determine digestibility. Beginning on day 10 of each period, titanium dioxide was dosed at 5 g/steer twice daily at 07:00 and 15:00 hours for seven days before and during the collection period.

TABLE 8

Diet composition (DM basis) for each treatment fed to growing steers

| | Treatment | | |
|---|---|---|---|
| Ingredient | CON | BMR | BMR-FL |
| Control silage | 80.0 | — | — |
| BMR silage | — | 80.0 | — |
| BMR-FL silage | — | — | 80.0 |
| Modified distillers grains plus solubles | 15.0 | 15.0 | 15.0 |
| Supplement | 5.0 | 5.0 | 5.0 |

Fecal grab samples were collected at 07:00, 11:00, 15:00, and 19:00 hours during day 1-4 of the collection period. Fecal samples were composited on a wet basis into daily composites and then freeze-dried. From daily, freeze-dried, and ground composites, a sample composite was prepared and subsequently analyzed for neutral detergent fiber (NDF), acid detergent fiber (ADF), starch, organic matter (OM), and Titanium (Ti) concentration. Ruminal pH was recorded every minute using wireless pH probes (Dascor, Inc., Escondido, Calif.) from day 1 to 4 of the collection period. Feeds offered and refused were analyzed for DM, OM, NDF, ADF, starch, and lignin percentage. Dry matter of feed ingredients and orts were determined using a forced-air oven at 60° C. for 48 hours.

An in situ study was conducted on day 21 of each period. Dacron bags (Ankom Techology, Fairport, N.Y.) were filled with 1.25 g of as-is dry corn bran, CON, BMR, or BMR-FL silage. Four bags per feedstuff were placed in mesh bags and incubated in the ventral rumen of each of the six (6) steers for an incubation time period of 30 hours. Bags were incubated at 08:00 hours on day 4 of collection period, and all bags were removed at 14:00 hours on day 5 of the collection period. Two non-incubated bags (0 hour) were also prepared for each sample. NDF disappearance was determined for in situ bags containing corn bran and corn silage by refluxing bags in neutral detergent solution using the ANKOM[200] Fiber Analyzer (Ankom Technology). NDF disappearance of corn bran and each corn silage within each dietary treatment was calculated by subtracting remaining residue of each sample (30 hours) from the initial value (0 hour). Whole rumen contents were collected on day 5 at 14:00 (6 hours post feeding). Rumen pH was continuously monitored with indwelling pH probes during each collection period. Gas production was measured for 6 hours at 0, 2, 4 and 6 hours post rumen sampling. Gas production was measured using ANKOM RF gas production bottles.

Digestibility data were analyzed as a Latin rectangle using the mixed procedure of SAS (SAS Institute, Inc., Cary) with period and treatment as fixed effects and steer as a random effect. The mixed procedure of SAS was used for in situ data analysis with fixed effects of treatment, sample type, and the treatment×sample type interaction. In situ bag was the experimental unit. Steer and steer×treatment were used as random effects in the in situ analysis. Ruminal pH data were analyzed as repeated measures using the GLIMMIX procedure with day as the repeated measure, treatment as a fixed effect, and steer as a random effect.

Feeding BMR or BMR-FL treatment tended to increase (P=0.11) DMI and OM intake compared to feeding CON treatment (Table 9), which was observed in a growing study with identical diets fed to steers. Digestibility of DM tended to be impacted by treatment (P=0.11) with steers fed BMR or BMR-FL treatment having greater DM digestibility than steers fed CON treatment. Digestibility of OM was impacted by treatment (P=0.06), with steers fed BMR-FL treatment having greater OM digestibility than steers fed CON treatment, with steers fed BMR treatment being intermediate.

TABLE 9

Effects of feeding different treatment on intake and digestibility of nutrients

| Item | Control | BMR | BMR-FL | SEM | P-Value |
|---|---|---|---|---|---|
| DM | | | | | |
| Intake, lb/d | 15.0 | 16.5 | 16.2 | 1.1 | 0.11 |
| Excreted, lb/d | 5.1 | 5.3 | 4.8 | 0.4 | 0.42 |
| Digestibility, % | 65.3 | 68.3 | 69.9 | 1.6 | 0.11 |
| OM | | | | | |
| Intake, lb/d | 13.8 | 15.1 | 15.1 | 1.0 | 0.11 |
| Excreted, lb/d | 4.4 | 4.5 | 4.1 | 0.3 | 0.41 |
| Digestibility, % | 67.7$^b$ | 70.5$^{ab}$ | 72.4$^a$ | 1.4 | 0.06 |
| NDF | | | | | |
| Intake, lb/d | 5.9 | 6.5 | 6.1 | 0.4 | 0.08 |
| Excreted, lb/d | 3.1$^b$ | 2.7$^a$ | 2.5$^a$ | 0.2 | 0.01 |
| Digestibility, % | 46.5$^b$ | 58.4$^a$ | 58.2$^a$ | 2.2 | <0.01 |
| ADF | | | | | |
| Intake, lb/d | 3.5$^{ab}$ | 3.8$^a$ | 3.3$^b$ | 0.2 | 0.03 |
| Excreted, lb/d | 2.0$^b$ | 1.6$^a$ | 1.5$^a$ | 0.1 | <0.01 |
| Digestibility, % | 40.8$^b$ | 58.1$^a$ | 53.3$^a$ | 2.5 | <0.01 |
| Starch | | | | | |
| Intake, lb/d | 4.5 | 4.6 | 5.0 | 0.4 | 0.11 |
| Excreted, lb/d | 0.15$^b$ | 0.25$^a$ | 0.19$^{ab}$ | 0.04 | 0.03 |
| Digestibility, % | 96.6$^b$ | 94.8$^b$ | 96.0$^{ab}$ | 0.7 | 0.03 |

$^{a,b,c}$Means with different superscripts differ (P < 0.05)

There were significant differences in NDF excretion and NDF digestibility due to treatment (P<0.01). BMR treatment (58.4%) or BMR-FL treatment (58.2%) had greater (P<0.01) NDF digestibility compared to CON treatment (46.5%), but there was no difference (P>0.10) between BMR treatment (58.4%) and BMR-FL treatment (58.2%).

Intake of ADF was highest (P=0.03) for BMR treatment and lowest for BMR-FL treatment, with CON treatment being intermediate. However, there were no differences (P>0.10) in ADF digestibility between BMR (58.1%) and BMR-FL treatment (53.3%), but both were greater (P<0.01) in ADF digestibility than CON treatment (40.8%).

Steers fed BMR treatment excreted the highest (P=0.03) amount of starch, and steers fed CON treatment excreted the least amount of starch. All of three treatments provide a starch digestibility of greater than 94.5%. CON treatment (96.6%) had the greatest (P=0.03) starch digestibility with BMR-FL treatment (96.0%) being intermediate, and BMR treatment (94.8%) had the least starch digestibility.

The general improvements in NDF, ADF, and OM digestibility for steers fed BMR or BMR-FL treatment likely explain the greater dry matter intake (DMI) observed in the study, as well as the greater gain observed in a previous growing study.

For in situ disappearance results, no diet×sample interactions for NDF digestibility were observed (P=0.12). Both main effect of diet fed to steer and simple effects of sample within diet fed were discussed (Table 10).

TABLE 10

Effects of treatment type on corn bran and silage in situ NDF digestibility (%)

| | Treatment | | | | |
|---|---|---|---|---|---|
| | CON | BMR | BMR-FL | SEM | P-value |
| % NDFD$^{1,2}$ | 66.10$^b$ | 72.09$^a$ | 72.70$^a$ | 3.28 | <0.01 |
| % NDFD$^2$ of each ingredient | | | | | |
| Corn Bran | 44.47$^b$ | 55.45$^a$ | 55.78$^a$ | 4.37 | <0.01 |
| CON Silage | 74.55 | 78.66 | 75.77 | 4.37 | 0.54 |
| BMR Silage | 65.48$^b$ | 78.48$^a$ | 75.37$^a$ | 4.04 | <0.01 |
| BMR-FL Silage | 79.88 | 75.76 | 83.87 | 4.59 | 0.30 |

$^{a,b,c}$Means with different superscripts differ (P < 0.05)
$^1$in situ neutral detergent fiber digestibility
$^2$Main effect on in situ NDFD averaged for all feeds incubated in steers fed each different treatment diet At the incubation time of 30 hours, there was an increased NDF disappearance (P<0.01) from feeds incubated in steers fed BMR or BMR-FL treatment, compared to when samples were incubated in steers fed CON treatment. These data suggest an improvement in the rumen environment for fiber digestion when cattle are fed with fed BMR or BMR-FL treatment. Corn bran was incubated as it is very high in NDF, but low in ADF content. Disappearance of NDF from corn bran was lowest (P<0.01) when incubated in steers fed CON, but not different when incubated in steers fed BMR or BMR-FL treatment. For the actual silages incubated in each steer across all treatments, the only silage that was impacted by the treatment fed to the steer was BMR silage. When BMR silage was incubated in steers fed CON treatment, NDF disappearance was lower than when BMR silage was incubated in steers fed either BMR or BMR-FL treatment. No differences were observed (P>0.30) between CON silage and BMR-FL silage when incubated in steers fed the different treatment diets.

There was a significant decrease (P<0.01) in average ruminal pH between BMR or BMR-FL treatment (6.24) vs. CON treatment (6.50) (Table 11). Additionally, BMR and BMR-FL treatment had lower (P<0.01) maximum pH and lower (P<0.01) minimum pH compared to CON treatment. The lower pH is likely due to greater fermentation and greater rumen digestibility of BMR or BMR-FL treatment. Gas production rates of whole rumen contents when collected at peak fermentation showed a significant increase in gas production rate over 20 hours for BMR or BMR-FL treatment as compared to CON BMR or BMR-FL treatment, but there was not difference between BMR and BMR-FL treatments.

TABLE 11

Effects of treatment type on rumen pH measurements and gas production rates

| Variable | Treatments | | | SEM | P-value |
| --- | --- | --- | --- | --- | --- |
| | CON | BMR | BMR-FL | | |
| Maximum pH | 6.64$^b$ | 6.37$^a$ | 6.41$^a$ | 0.07 | <0.01 |
| Average pH | 6.50$^b$ | 6.22$^a$ | 6.26$^a$ | 0.07 | <0.01 |
| Minimum pH | 6.38$^b$ | 6.08$^a$ | 6.12$^a$ | 0.07 | <0.01 |
| Change in pH | 0.26$^b$ | 0.29$^a$ | 0.29$^a$ | 0.17 | <0.01 |
| Variance in pH, % | 0.60$^b$ | 0.85$^a$ | 0.90$^a$ | 0.11 | <0.01 |
| Gas production rate, mL/g DM | 25.74$^b$ | 30.77$^a$ | 28.72$^a$ | 2.44 | 0.03 |

$^{a,b,c}$Means with different superscripts differ (P < 0.05)

While the present invention has been described herein with respect to certain preferred embodiments, those of ordinary skill in the art will recognize and appreciate that it is not so limited. Rather, many additions, deletions, and modifications to the preferred embodiments may be made without departing from the scope of the invention as hereinafter claimed. In addition, features from one embodiment may be combined with features of another embodiment while still being encompassed within the scope of the invention as contemplated by the inventors.

What is claimed is:

1. A method of increasing meat quantity of a silage fed animal, the method comprising feeding the animal with a finishing ration comprising a silage produced from a corn hybrid comprising brown midrib (bmr) and floury traits, thereby increasing the meat quantity of the silage-fed animal compared with a control animal fed a comparable diet comprising silage comprising the brown midrib (bmr) trait or the floury trait, but not both traits.

2. The method of claim 1, wherein the silage fed animal is a cattle steer.

3. The method of claim 1, wherein the corn hybrid comprises a brown-midrib-3 (bm3) gene and a floury2 (fl2) gene.

4. The method of claim 1, wherein the finishing ration comprises from about 10% to about 45% of the silage based on a diet dry matter.

5. The method of claim 1, wherein the finishing ration comprises from about 15% to about 45% of the silage based on a diet dry matter.

6. The method of claim 4, wherein the finishing ration comprises grain which is yellow dent corn.

7. The method of claim 1, wherein the finishing ration comprises distillers grains.

8. The method of claim 7, wherein the finishing ration comprises from about 10% to about 45% of the silage based on a diet dry matter grains, and about 15% of the distillers grains based on a diet dry matter.

* * * * *